United States Patent [19]
Uchiyama
[11] 3,806,820
[45] Apr. 23, 1974

[54] AUDIO APPARATUS

[75] Inventor: Yasuji Uchiyama, Kitahama, Japan
[73] Assignee: Nippon Gakki Seizo Kabushiki Kaisha, Shizuolia-ken, Japan

[22] Filed: Feb. 24, 1972
[21] Appl. No.: 229,079

[30] Foreign Application Priority Data
Mar. 25, 1971 Japan .............................. 46-17467

[52] U.S. Cl. ............... 325/478, 179/1 SW, 325/403
[51] Int. Cl. ............................................ H04b 1/10
[58] Field of Search ........................... 325/416–418, 325/395, 402–404, 408, 456, 478; 340/258 C, 258 D; 179/15 W

[56] References Cited
UNITED STATES PATENTS
2,560,313 10/1951 Tellier ............................... 325/417

*Primary Examiner*—Robert L. Griffin
*Assistant Examiner*—Marc E. Bookbinder

[57] ABSTRACT

An audio apparatus includes a touch detective muting arrangement. Switch actuating knobs made of metal are electrically insulated from the circuit ground and connected to an electro-static field detector circuit detecting a touch of an operator's finger with the knobs and producing a control signal. A muting circuit is provided in the audio signal path and connected to the detector circuit to be controlled by the control signal. When a finger touches the knob, the muting circuit is rendered operative to mute the audio signal, thus preventing undesirable click noise which might otherwise come out in accordance with changing-over manipulation of the switch.

3 Claims, 4 Drawing Figures

AUDIO APPARATUS

DETAILED DESCRIPTION OF THE INVENTION

This invention relates to an audio apparatus and more particularly to a muting arrangement therefor which is rendered operative utilizing the electrostatic fields of an operator's human body when the knobs or buttons of change-over switches are touched by the operator's fingers to select desired on of sectious such as various frequency bands of a radio receiver, a tape player, a disc player, a microphone amplifier etc., and of various volume control circuits.

The principal object of the invention is to provide a muting arrangement which is particularly adapted to be constructed so as to utilize the electrostatic fields established from an operator's human body who manually operates knobs or buttons of change-over switches.

Another object of the invention is to provide a muting arrangement which prevents undesirable click noises which might otherwise come out in accordance with changing-over manipulation of the switch.

A still further object of the invention is to provide a muting arrangement which is not required to use conventional mechanical muting switches and utilizes a minimum number of component parts, and which may be constructed on a less expensive and economical basis.

For a better understanding of the invention, reference is taken to the accompanying drawings, in which.

Figure 1:
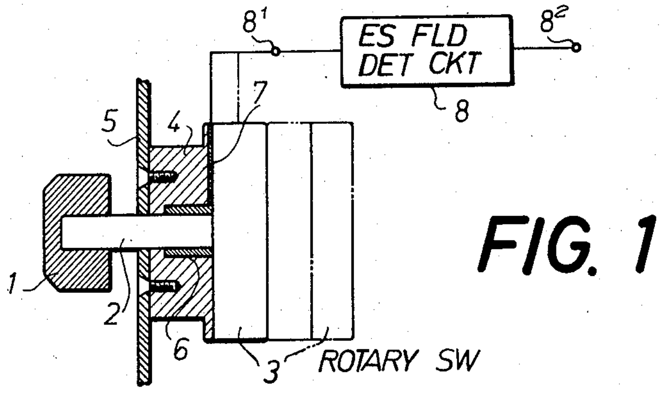
FIG. 1 shows diagrammatically, as one embodiment, a rotary switch with a knob and an electrostatic field detector circuit, in which a part of the rotary switch is shown in a cross sectional view and the electrostatic field detector cross sectional view and the electrostatic field detector circuit is shown in a block.

Referring to FIG. 1, 1 represents a knob made of an electrically conductive material and coaxially mounted on a conductive shaft 2 for operating a rotary switch 3 provided with a plurality of fixed contacts therein. The rotary switch 3 is secured through an insulating spacer 4 to a chassis 5 enclosed in an audio apparatus.

The insulating spacer 4 is provided at its inner periphery of its bore with a conductive sleeve 6 which is electrically in contact with the conductive operating shaft 2. Made in contact with the conductive sleeve 6 is a contact piece 7 which is connected to an input terminal $8^1$ of an electrostatic field detector circuit 8 to be described later.

Figure 2:
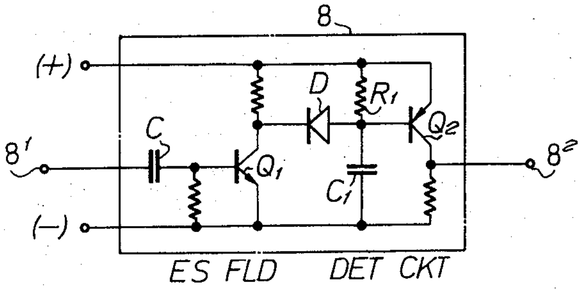
FIG. 2 shows a detail of the electrostatic field detector circuit shown in FIG. 1.

In FIG. 2 there is shown an embodiment of the electrostatic field detector circuit 8 which consists of an amplifier circuit comprising a first transistor $Q_1$ whose base is connected through a capacitor C to the input terminal $8^1$, a second transistor $Q_2$ whose base circuit includes a resistor $R_1$ and a capacitor $C_1$, and a diode D connected across the collector of the first transistor $Q_1$ and the base of the second transistor $Q_2$. The collector of the second transistor $Q_2$ is connected to an output terminal $8^2$ of the electrostatic detector circuit 8.

Figure 3:
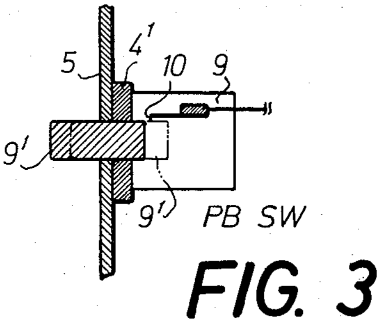
FIG. 3 shows diagrammatically, as another embodiment, a push button switch with a button.

FIG. 3 shows a push button switch 9 which may be used instead of the rotary switch 3 shown in FIG. 1. The push button switch 9 is secured through an insulating spacer $4^1$ to the chassis 5 of the audio apparatus (not shown) and is provided with a conductive push button $9^1$ extending through the chassis 5 and the insulating spacer $4^1$. Slidably in engagement with the conductive push button $9^1$ is a brush piece 10 which is connected to the input terminal $8^1$ of the electrostatic field detector circuit 8. The electrostatic fields established from an operator's human body who manually operates the push button $9^1$ are supplied through the brush piece 10 to the input terminal $8^1$ of the electrostatic field detector circuit 8 which produces a signal that is applied via the output terminal $8^2$ to a muting circuit to be described later.

Use may also be made of any other change-over switches such as a slide switch, snap switch etc., in which the manual conductive knob is insulated from the earthed chassis and the electrostatic fields established from the operator's human body who manually operates the conductive knob are supplied through lead wires, conductive pieces or brushes to the input terminal $8^1$ of the electrostatic field signal detector circuit 8.

Figure 4:
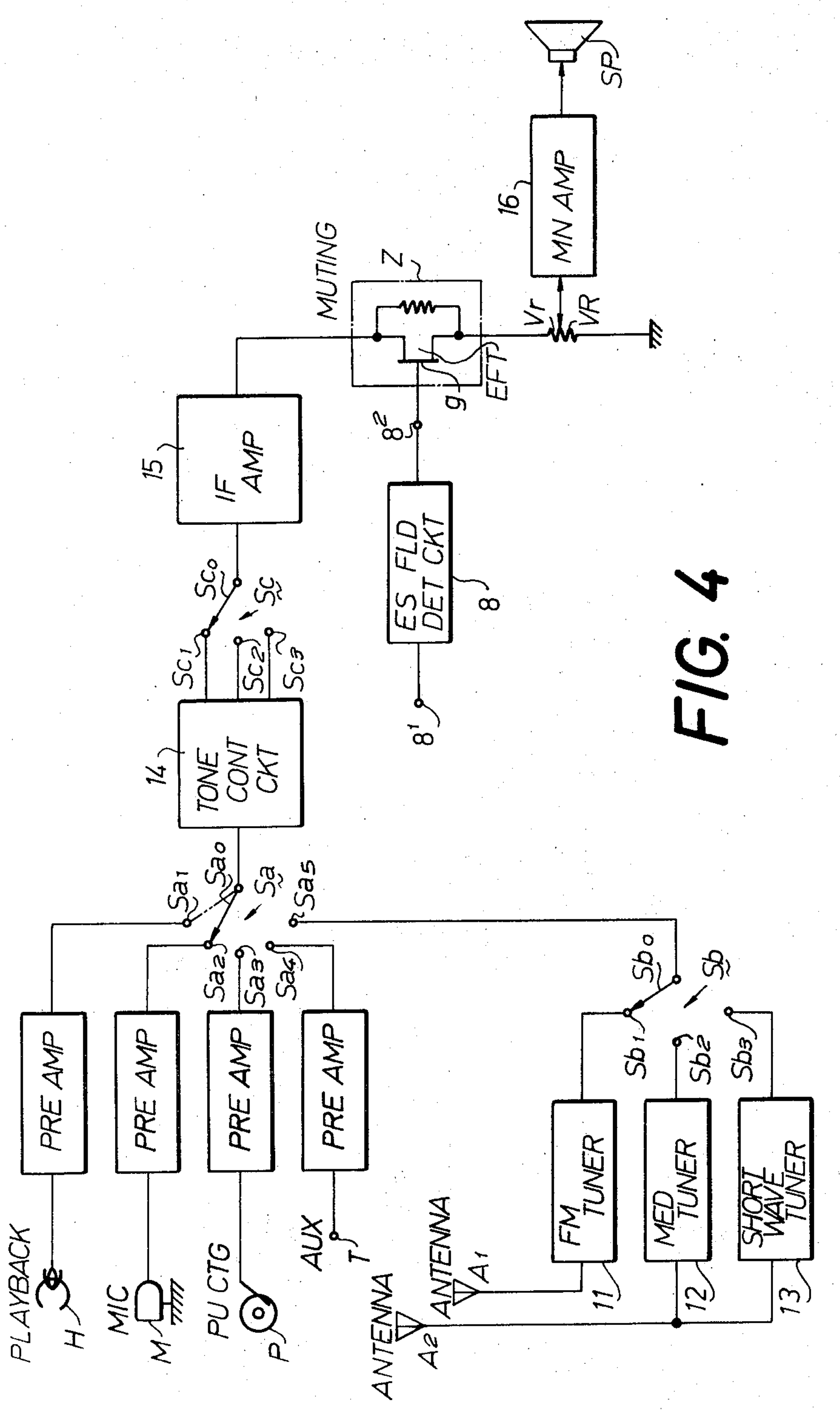
FIG. 4 is the circuit block diagram of an embodiment of the audio apparatus including the muting arrangement according to the invention.

FIG. 4 shows an embodiment of an audio apparatus including muting arrangement according to the invention which utilizes the electrostatic field signals obtained through the electrostatic field detector circuit 8 to prevent undesirable click noises from coming out during the switching operations of the apparatus selecting a radio receiver section, amplifier, record player etc., and volume control circuits. In FIG. 4, H designates a playback head of a tape player, M a microphone, P a pickup cartridge of a disk player and T an external input terminal. The playback head H, the microphone M, the pickup cartridge P and the external input terminal T are connected through respective preamplifiers to fixed contacts $Sa_1$, $Sa_2$, $Sa_3$ and $Sa_4$ of a function selecting change-over switch Sa having a movable contact arm $Sa_0$ associated with a plurality of the fixed contacts, the switch being such as the rotary switch shown in FIG. 1 or the button switch shown in FIG. 3, respectively.

The audio frequency signal output terminals of an FM tuner 11 connected to a receiving antenna $A_1$ and of a MW (medium wave) tuner 12 and SW (short wave) tuner 13 connected to another receiving antenna $A_2$ are connected to fixed contacts $Sb_1$, $Sb_2$ and $Sb_3$ of a frequency band selective switch Sb, respectively. A movable contact arm $Sb_0$ of the frequency band selective switch Sb is connected to a fixed contact $Sa_5$ of the function change-over switch Sa whose movable contact arm $Sa_0$ is connected to an input side of a succeeding tone control circuit 14. Output terminals of three channels of the tone control circuit 14 are connected to fixed contacts $Sc_1$, $Sc_2$ and $Sc_3$ of a tone selective switch Sc having a movable contact arm $Sc_0$ associated with a plurality of fixed contacts, respectively. The movable contact arm $Sc_0$ of the tone selectve switch Sc is connected, through an intermediate amplifier 15 and a muting circuit Z essentially consisting of a field effect transistor FET, to one terminal of a variable resistor VR whose another terminal is connected to the ground. A slidable arm Vr of the variable resistor VR is connected through a main amplifier 16 to a loudspeaker SP.

The field effect transistor FET of the muting circuit Z has a gate electrode g connected to the output terminal $8^2$ of the electrostatic field detector circuit 8. The impedance of the muting circuit Z is increased when a control signal of, for example, positive potential is applied to the gate electrode g.

The knobs or buttons of the switches Sa, Sb and Sc are electrically connected to the input terminal $8^1$ of the electrostatic field detecting circuit.

The operation of the apparatus shown in FIG. 4 is as follows.

If it is desired to supply the sound signals recorded on a magnetic tape and reproduced by the playback head H to the loudspeaker SP, the knob 1 or push button $9^1$ of the function selective switch Sa is manually operated to bring the movable contact arm $Sa_0$ into contact with the fixed contact $Sa_1$. Then, the electrostatic fields established from the operator's human body is applied from the conductive knob 1 through the conductive shaft 2, conductive sleeve 6 and the contact piece 7 or from the conductive push button $9^1$ through the brush piece 10 to the input terminal $8^1$ of the electrostatic field detector circuit 8. The electrostatic fields are thus applied to the base of the first transistor $Q_1$ which becomes conductive to decrease its collector voltage. Then, the diode D becomes conductive to decrease the base voltage of the second transistor $Q_2$ with the result that the second transistor $Q_2$ becomes conductive to increase its collector potential that is applied to the gate electrode g of the field effect transistor FET. The impedance of the muting circuit Z is thus increased to block click noises produced when the movable contact arm $Sa_0$ of the function selective switch Sa is brought into contact with the fixed contact $Sa_1$. Thus, the click noise is not applied to the main amplifier 16 whereby any noise could not be heard from the loudspeaker SP.

If the operator takes his fingers off the knob 1 or push button $9^1$, the electrostatic fields are not applied from the knob 1 or push button $9^1$ to the input terminal $8^1$ of the electrostatic field detector circuit 8 so that the first transistor $Q_1$ becomes nonconductive to increase its collector voltage. Thus the diode D becomes nonconductive to increase the base voltage of the second transistor $Q_2$ with the result that the second transistor $Q_2$ becomes nonconductive to decrease its collector potential. The impedance of the muting circuit Z is thus decreased to a normal low impedance value. Thus, the sound signals recorded on the magnetic tape and reproduced by the playback head H can be amplified by means of the intermediate amplifier 15 and the sound signals thus amplified can be supplied through the variable resistor VR and main amplifier 16 to the loudspeaker SP. Thus, the mere touch of the operator's fingers on the switch knob ensures noise prevention during selecting manipulation.

Alternatively, if the knob 1 or push button $9^1$ of the function selecting switch Sa is manually operated to bring the movable contact arm $Sa_0$ into contact with the fixed contact $Sa_2$, the sound waves supplied to the microphone M can be heard through the loudspeaker SP without any undesirable change-over click noise.

Moreover, any one of the tuners 11, 12 and 13 may selectively be incorporated into the amplifier system by manually operating the knob 1 or push button $9^1$ of the frequency band selective switch Sb provided the movable contact arm $Sa_0$ of the function selective switch Sa is made in contact with the fixed contact $Sa_5$. Thus, the presence of the muting circuit Z ensures to prevent the click noise from coming out during the switching operations of the function selective switch Sa, frequency band selective switch Sb and tone curve selective switch Sc. During these switching operations if the operator takes his fingers off the knob 1 or push button $9^1$, the electrostatic fields are not applied therefrom to the input terminal $8^1$ of the electrostatic field detector circuit 8 thereby decreasing the impedance of the muting circuit Z to a normal low impedance value. Thus, any desired broadcast program received at the antenna $A_1$, $A_2$ can be supplied through any one of the tuners 11, 12 and 13 selected by the frequency band selective switch Sb, the variable resistor VR and the main amplifier 16 to the loudspeaker SP, without producing noises during the changeover manipulation of the apparatus.

As explained hereinbefore, a combination of the use of the electrostatic fields established from the switching knob or push button and the provision of the electrostatic field detector circuit 8 and of the muting circuit Z described ensures click noise prevention and further provides an important advantage that muting can be carried out by mere touch of the operator's fingers on the switch knob or button in an extremely simple manner. Thus, the muting arrangement according to the invention can be handled by ladies or children who are not familiar with the audio apparatus such as amplifiers, FM tuners etc. in an easy and reliable manner. Moreover, the invention provides such an improved muting arrangement which utilizes a minimum of component parts, and which may be constructed on a less expensive and economical basis. The combination of the use of the electrostatic fields established from the switch knob or push button and the provision of the electrostatic field detector circuit and the muting circuit results in considerable constructional advantages that conventional mechanical muting switches are dispensed with, that the apparatus as a whole can be used for a long time and has an excellent adaptability and moisture resistant property, and that large area of the operating panel surface may freely be used for design and decorative effects.

Various other modifications may be made without departing from the spirit of the invention.

What is claimed is:

1. An audio apparatus with muting circuit, comprising an audio apparatus having an audio signal path, a discrete selection change-over switch generating click noise during a switching change over operation and disposed in said audio signal path, a muting arrangement comprising a switch knob coupled to said switch for the actuation thereof, said knob being made of an electrically conductive material and insulated from the ground, an electrostatic field detector circuit for detecting the electrostatic field established from the human body of an operator who manually operates said switch knob thereby providing a control signal, a muting circuit means incorporated in said audio signal path and for changing its impedance in response to said control signal supplied from said electrostatic field detector circuit and decreasing signal transmissibility during the switching change-over operation muting transmissibility of said click noise in the audio signal path during the manipulations of said switch knob.

2. In an audio apparatus having an audio signal path;

a muting arrangement comprising a switch knob of an electrically conductive material and insulated from the ground, an electrostatic field detector circuit for detecting the electrostatic field established from an operator's human body who manually operates said switch knob thereby providing a control signal, a muting circuit incorporated in the audio signal path and adapted to change its impedance in response to said control signal supplied from said electrostatic field detector circuit thereby decreasing signal transmissibility in the audio signal path during the manipulations of said switch knob, said electrostatic field detector circuit includes, an input terminal, an output terminal, an amplifier circuit comprising a first transistor having a base connected through a capacitor to said input terminal, a second transistor having a base circuit which includes a resistor and a capacitor, and a diode connected across the collector of said first transistor and the base of said second transistor, the collector of said second transistor being connected to said output terminal.

3. In an audio apparatus having an audio signal path;

a muting arrangement comprising a switch knob of an electrically conductive material and insulated from the ground, an electrostatic field detector circuit for detecting the electrostatic field established from an operator's human body who manually operates said switch knob thereby providing a control signal, a muting circuit incorporated in the audio signal path and adapted to change its impedance in response to said control signal supplied from said electrostatic field detector circuit thereby decreasing signal transmissibility in the audio signal path during the manipulations of said switch knob, said muting circuit includes a field effect transistor comprising, a gate electrode connected to an output terminal of said electrostatic field detector circuit, the impedance of said muting circuit being increased or decreased in response to the presence or absence of said control signal applied to said gate electrode.

* * * * *

UNITED STATES PATENT OFFICE
CERTIFICATE OF CORRECTION

Patent No. 3,806,820 Dated April 23, 1974

Inventor(s) Yasuji Uchiyama

It is certified that error appears in the above-identified patent and that said Letters Patent are hereby corrected as shown below:

The Assignee should read -- Nippon Gakki Seizo Kabushiki Kaisha, Shizuoka-ken, Japan --.

Signed and sealed this 5th day of November 1974.

(SEAL)
Attest:

McCOY M. GIBSON JR.
Attesting Officer

C. MARSHALL DANN
Commissioner of Patents